June 3, 1941.   E. A. LINK, JR   2,244,464
SIGNAL CONTROLLING MEANS
Filed March 15, 1938   2 Sheets-Sheet 1

INVENTOR.
EDWIN A. LINK JR.
BY *Philip S. Hopkins*
ATTORNEY.

June 3, 1941.  E. A. LINK, JR  2,244,464
SIGNAL CONTROLLING MEANS
Filed March 15, 1938  2 Sheets—Sheet 2
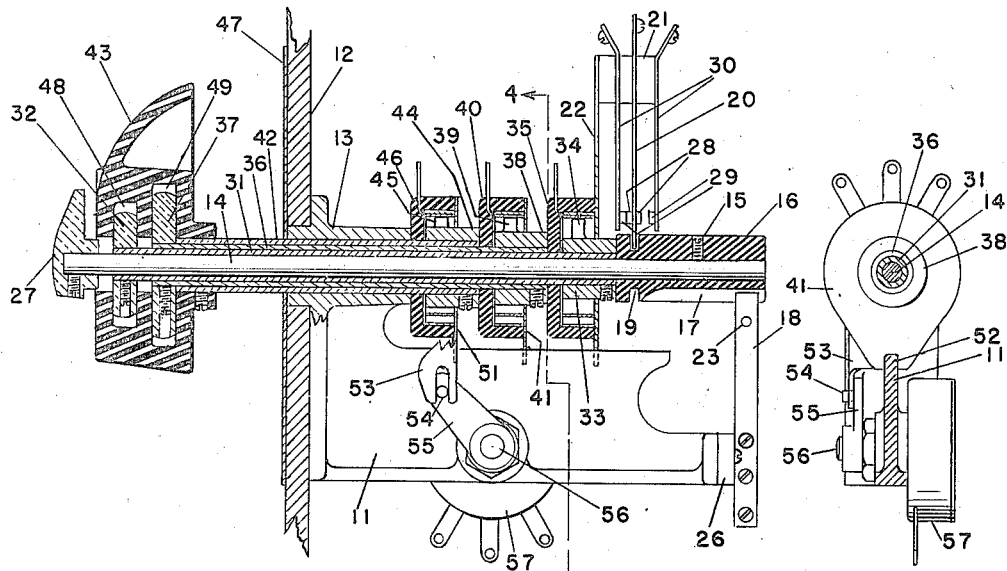
FIG. 3.  FIG. 4.
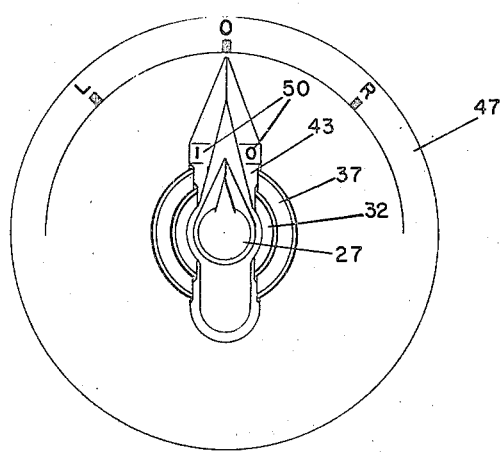 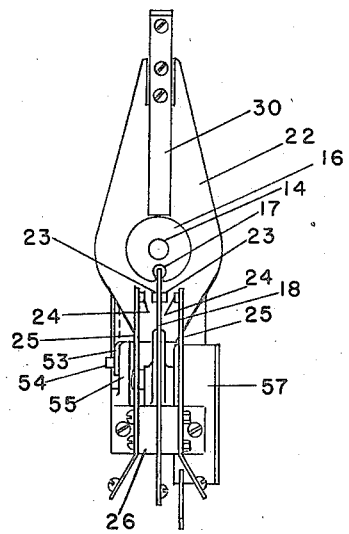
FIG. 5.  FIG. 6.
INVENTOR.
EDWIN A. LINK JR.
BY
*Philip S. Hopkins*
ATTORNEY.

Patented June 3, 1941

2,244,464

UNITED STATES PATENT OFFICE 2,244,464

SIGNAL CONTROLLING MEANS

Edwin A. Link, Jr., Binghamton, N. Y.

Application March 15, 1938, Serial No. 196,024

1 Claim. (Cl. 74—503)

My invention relates to a signal controlling means.

In the instruction of pilots in the art of flying by instrument and the use of radio signals in locating and maintaining a course of flight, and in the use of apparatus equipped with the necessary signal transmitting and receiving equipment for practice and experience in this art, there is a considerable number of signals involved as well as means for controlling the character of such signals.

Signaling equipment for this purpose is provided in airplanes with the receiving apparatus located in the student's seat and the signal sending apparatus located in the instructor's seat. Training with this equipment is, of course, obtained during actual flight of the airplane and under actual flight conditions of little visibility, or with the student under a hood.

Such signaling equipment is also used with the Link trainer. In this use the receiving equipment is placed in the trainer and the instructor is seated at a desk where he may observe the position of the trainer, either by direct observation or by instruments, and transmit the signals to the student in accordance with the observed positions.

In either manner of use, the instructor is burdened with such a large number and variety of operations in properly transmitting the correct signals to the student that it is difficult for him to accurately, and with proper timing, control such signal transmission in a manner to simulate exactly the signals received under like conditions by a pilot in actual flight from the ground radio stations provided for that purpose.

To give an example, such signaling equipment includes among other things a telephone circuit between instructor and student by which verbal instructions may be given, or weather reports and the like simulated. Then there are at least two marker beacon circuits by which inner and outer marker beacon signals may be transmitted to the student at the proper time. In addition, there is a volume control for the marker beacon circuits.

There is also provided the audible station beam signals by means of which the pilot can identify his position with relation to the beam, i. e., either on one side or the other, or on course. There is also provided a volume control for the beam signals.

Also in this group of simulated radio signals is a flight path indicator, by means of which the student can check his vertical and lateral positions with respect to a glide path when coming in for a landing.

These are but one group of instruments and circuits which the instructor must use in conveying simulated radio information to the student. There are, of course, many other things which he must observe, control, compute and record, during the period of instruction—particularly in the use of the apparatus for blind landings. This is especially true if the equipment is mounted in an airplane where the instructor has to at all times be ready to take over the controls if the student gets into difficulty.

The primary object of my invention is to provide a control means which is unified in a manner that will permit the instructor to control and operate all of the above mentioned simulated radio signals and circuits with one hand and without moving that hand from one position to another. This greatly simplifies the work of the instructor and makes possible more accurate signaling.

Another object of my invention lies in the unique and simplified assembly of electric current controlling means by which such simplified control is made possible.

Other objects and advantages will be apparent as the description proceeds, reference now being had to the figures of the accompanying drawings forming a part of this application and wherein like reference numerals indicate like parts.

In the drawings:

Figure 3 is a detail sectional side view of my improved signal controlling apparatus.

Figure 4 is a detail sectional view taken on the line 4—4 of Figure 3.

Figure 5 is a front view of the controlling elements and dial for the apparatus.

Figure 6 is a rear end view of the controlling means.

Figure 1:
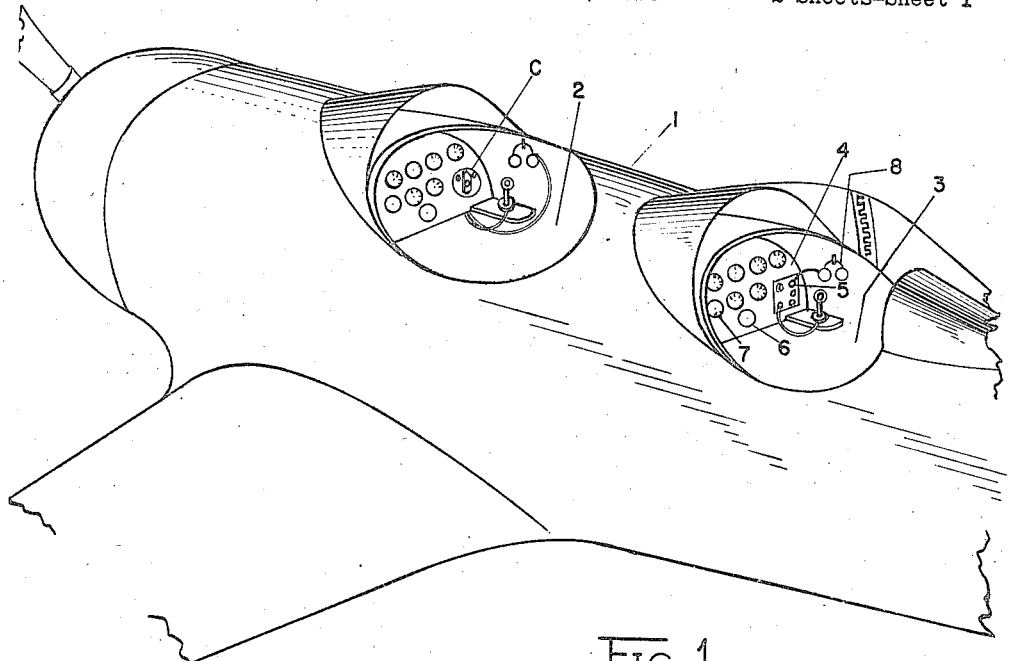
Figure 1 is a perspective outline view of a portion of an airplane showing the instructor's seat and the student's seat in connection with which my invention is adaptable.

In Figure 1 I have shown the application of my invention to the student's and instructor's seat in an actual airplane and in which the plane is indicated at 1, the instructor's seat as 2, and the student's seat as 3. In the student's seat 3, there is provided on the instrument panel 4 a signal receiving set 5 by means of which the student can "tune in" and control volume. In addition to the regular flight instruments of an airplane such as altimeter, air speed indicator, tachometer, compass, turn and bank indicator, etc., there are provided a marker beacon indicator 6, and a flight path indicator 7. There is also provided in the student's seat, a set of earphones 8 by means of which the student receives the audible signals from the signal sending equipment under the control of the instructor.

In the instructor's seat 2 there is provided a duplicate seat of instruments, and in addition, the various controls and signal transmitting equipment necessary to send the desired signals to the student. Among these controls is the unified apparatus comprising the object of this invention and which is indicated generally at C.

Figure 2:
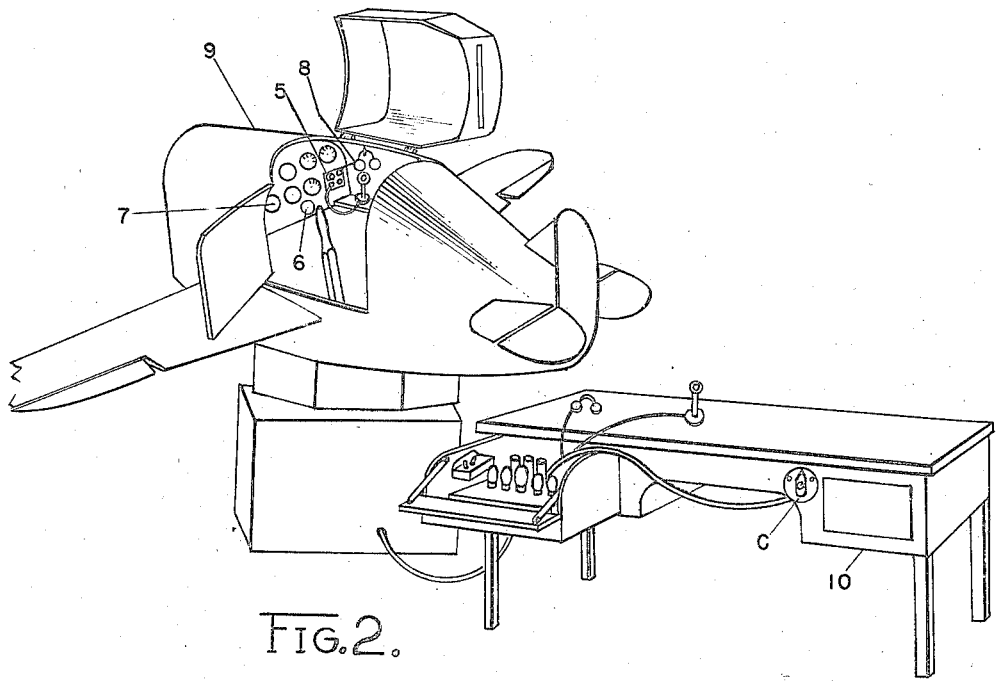
Figure 2 is an outline perspective view of a Link trainer with instructor's desk and signaling equipment, for which my invention is also adaptable.

In Figure 2 is shown the application of the invention to a Link trainer, indicated generally at 9, and in which the same equipment is provided as in the student's seat of the airplane. An instructor's desk 10 is provided, equipped with the necessary signal transmitting means and controls and including the same control C as in the instructor's seat in the airplane.

The detailed type of circuits used in the transmission of the signals from the instructor to the student in either case, and the type of signaling and receiving equipment and instruments may be conventional and form no part of this invention apart from the combination with the signal control means.

The unified controlling mechanism is illustrated clearly in Figures 3, 4, 5 and 6 and comprises a supporting bracket or member 11 suitably secured to the rear face of the instrument panel 12. A bearing 13 projecting rearwardly from the instrument panel 12 provides a support for a plurality of concentric rotatable and slidable members, the arrangement and operation of which will be described.

Extending longitudinally and centrally through the bearing 13 and through an opening in the instrument panel 12, is a shaft 14, the inner or rear end of which has secured thereto as at 15 an enlarged sleeve 16 preferably made of insulating material. The underside of this sleeve 16 is provided with a slot or groove 17 into which projects the free end of a spring contact member 18 fixedly secured at its lower end to a holder 26 on the support 11. One end of the sleeve 16 is provided with a circular groove 19 into which projects the free end of a spring contact member 20, the opposite end of which is secured in a holder 21 carried at the upper end of a supporting arm 22 suitably fixedly secured to a rheostat 35.

Adjacent the upper end of the spring contact member 18 there is provided on each side of said member, a contact element 23 adapted when the contact member 18 is flexed to one side or the other by the rotation of the shaft 14 and sleeve 16 to engage one of the contact elements 24 carried upon the free ends of spring contact members 25 having their opposite ends fixedly supported in the holder 26 mounted upon a support 11. The turning of the shaft 14 by means of the finger piece 27, secured to the outer end thereof, to the right or left will thus result in establishing a circuit through either the "right hand" contacts 23 and 24 or the "left hand" contacts 23 and 24 (in Figure 6), thus operating the inner or outer marker beacon circuits and causing the marker beacon indicator 6 to respond accordingly. The spring tension of the contact arm 18 is such as to normally maintain itself vertically between the contact elements 24 and return the shaft member 14 and handle member 27 to normal vertical position.

The shaft 14 together with the sleeve 16 is also slidable longitudinally by means of pushing or pulling on the handle member 27. The slot 17 on the underside of the sleeve 16 permits such sliding movement without interfering with the contact member 18. Adjacent the lower free end of the contact member 20 there is provided on each side thereof contact elements 28 adapted to engage contact elements 29 adjacent the lower ends of spring fingers 30 carried by the holder 21. In the normal position of these parts, the shaft 14 is pulled outwardly, that is, towards the front, in which position the "left hand" contact on the member 20 (Figure 3) is in engagement with the adjacent element 29. This provides for a normal closing of the beam circuit but which can, by sliding the shaft inwardly, cause the "right hand" contact element 28 to move into engagement with its adjacent contact element 29 (the "left hand" elements being thus separated to break the beam circuit) and to thus establish the telephone circuit over which the instructor can talk to the student.

The spring material of the contact member 20 tends to normally maintain these parts in the position shown in Figure 3, i. e., with the beam circuit closed and the telephone circuit open.

Rotatably mounted upon the shaft 14 is an elongated sleeve 31, the outer end of which has a knurled disk or finger piece 32 suitably secured thereto. The inner end of this sleeve extends to a point adjacent the inner end of the sleeve 16 and to this inner end is suitably secured a collar 33 provided with a brush 34 comprising the rotatable part of a rheostat 35 fixedly mounted upon the supporting arm 22. This rheostat comprises the volume control device for the marker beacon circuits and by rotation of the sleeve 31 by means of the finger piece 32, the rheostat is actuated to control the volume of whichever of these circuits is closed. As before explained, the selected closing of these circuits is accomplished by rotating the shaft 14 by means of the finger piece 27.

Rotatably mounted upon the sleeve 31 is a second elongated sleeve 36, the outer end of which is provided with a knurled disk or finger piece 37 suitably secured thereto and by means of which the sleeve 36 may be rotated. The inner end of this sleeve terminates adjacent the rheostat 35 and is provided at this inner end with a collar 38 suitably secured thereto. The collar 38 is provided with a brush 39 comprising the rotatable portion of the rheostat 40 fixedly mounted upon a supporting arm 41 carried by the support 11. This rheostat 40 is in the circuit of and adapted to control the volume of the beam signal. Thus by rotating the sleeve 36 by means of the finger piece 37, the volume of the beam signal can be controlled.

Rotatably mounted upon the sleeve 36 is a sleeve 42 provided at its outer end with an enlarged finger piece 43 suitably secured thereto. The inner end of this sleeve 42 terminates adjacent the rheostat 40 and is provided with a collar 44 suitably secured thereto. The collar 44 has secured thereto a brush 45 comprising the rotatable part of a beam signal rheostat 46 held between the bearing 13 and the collar 44. Rotation of the sleeve 42 by means of the finger piece 43 serves to control the beam signal, that is, the signal which indicates whether the student is to the left or to the right of his course, or on course. A dial 47 is mounted upon the panel 12 and properly marked for cooperation with this signal control.

It will be noted with reference to Figure 3 that the finger piece 43 is recessed at 48 to receive the control member 32 and at 49 to receive the control member 37. These control members 32 and 37 are of sufficiently large diameters to project outwardly at either side of the member 43 whereby they may be easily grasped and manipulated by the operator.

The finger piece 43 is also provided on its front face with indicators 50 corresponding to the inner and outer marker beacons and in cooperation with which markings the finger piece 27 operates.

The beam indicator rheostat 46 is carried by a supporting arm 51 and this supporting member together with the supporting members 41 and 22 have their lower ends notched as at 52 (see Figure 4) to slidably engage the upper edge of the support 11. This permits sliding movement of these controlling devices but prevents rotation thereof. Thus the entire assembly comprising shaft 14, the three sleeves 31, 36 and 42, the rheostats 35, 40, and 46, the sleeve 16, and the contact members 20 and 30, are all slidable as a unit longitudinally through the bearing 13. Such sliding movement may be accomplished by grasping the finger pieces 27 and 43 and moving the same inwardly and outwardly.

Extending downwardly from the supporting arm 51 on the beam signal control 46 is a bifurcated arm 53 engaging a transverse bar 54 carried by the free end of an arm 55 secured at its opposite end to the rotatable portion 56 of a conventional flight path signal control rheostat indicated generally at 57. Obviously longitudinal movement of the entire assembly as above described will result in rotating the arm 55 and actuating the flight path signal device 7.

It will thus be seen that I have provided a signal controlling means by which an operator with one hand can easily and quickly control any one or more of the signal circuits for the beam signals, telephone circuit, the two marker beacon circuits, the volume of the marker beacon circuits, the beam circuit volume, and the flight path indicator, without shifting the position of his hand from one controlling device to another. This enables the operator to have his other hand free for such operations as may be necessary or desirable.

It will be understood that I do not limit myself to the particular number of circuits or devices controlled by this device nor to the kind of signal circuits or devices controlled, as obviously the invention is capable of wide application.

Changes may be made in details of construction and arrangement of parts without departing from the spirit and scope of my invention. I do not limit myself, therefore, to the exact form shown, other than by the appended claim.

I claim:

A signal controlling device comprising a bearing, a sleeve slidably and rotatably carried by said bearing, a second sleeve carried by said first sleeve in rotatable relation thereto, a third sleeve carried by said second sleeve in rotatable relation thereto, a shaft carried by and in concentric relation to said third sleeve and being both rotatable and slidable relative thereto, a unified control device for said sleeves and shaft operable with one hand for moving the same independently and as a unit, said control comprising a knob secured to said first sleeve and partially housing a pair of spaced discs extending laterally from the knob and secured to the second and third of said sleeves, said shaft having an operating handle secured to its outer end and lying adjacent the said knob, said sleeves and said shaft being slidable together.

EDWIN A. LINK, Jr.